Feb. 21, 1956  H. F. BRINEN  2,735,698
HEADER PLATE-TUBE JOINT FOR HEAT-EXCHANGER CORE-UNITS
Filed Aug. 1, 1952
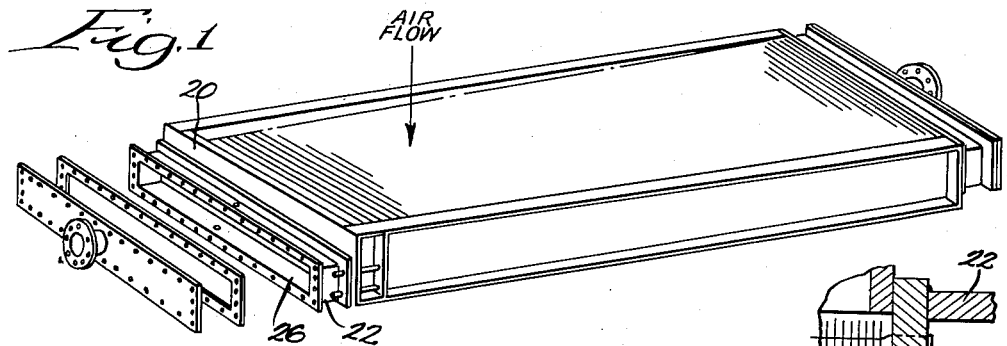
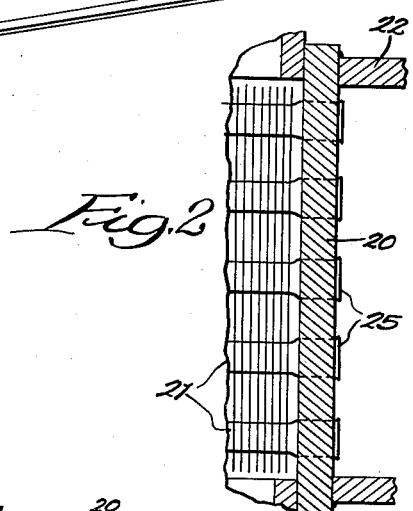
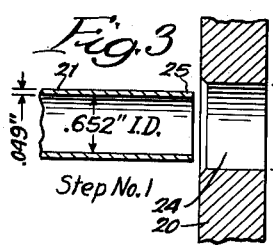
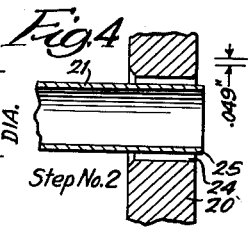
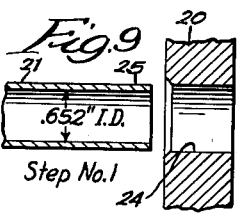
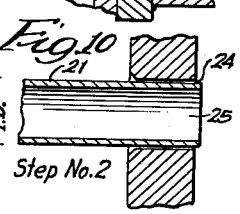
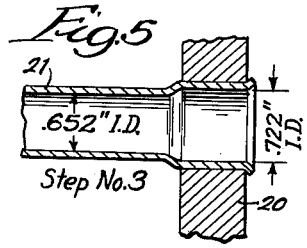
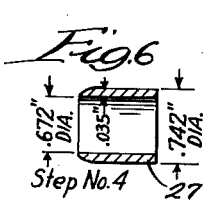
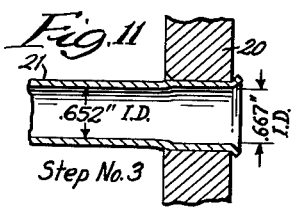
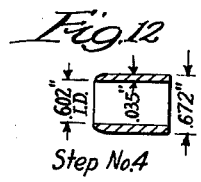
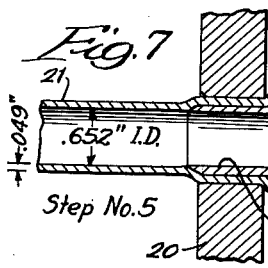
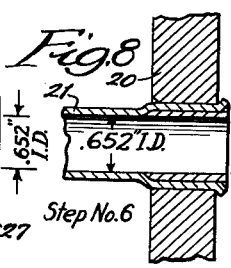
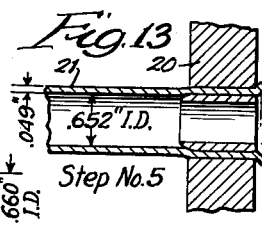
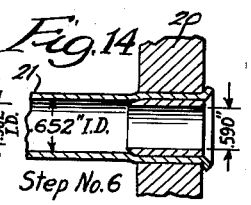
INVENTOR:
Howard F. Brinen,
BY
ATTORNEY.

United States Patent Office 2,735,698
Patented Feb. 21, 1956

2,735,698

HEADER PLATE-TUBE JOINT FOR HEAT-EXCHANGER CORE-UNITS

Howard F. Brinen, Racine, Wis., assignor to Young Radiator Company, Racine, Wis., a corporation of Wisconsin Application August 1, 1952, Serial No. 302,220

2 Claims. (Cl. 285—56)

This invention relates to heat-exchange core-units of the type wherein a plurality of tubes are arranged in spaced, parallel relationship and have their opposite ends bonded to header plates. Such a suit is sealed within a housing with the plates connected to headers whereby a transfer of heat is effected between fluids respectively flowing through the tubes from header to header and through the labyrinth formed around the tubes within the housing. For the greater part, the tubes for such core-units are formed of thin-wall metal of small diameter, generally not more than an inch. The header plates are of comparatively heavy material. The tube ends and the header plates have to be so bonded as to secure fluid tight joints that will preclude leakage between the tubes and the labyrinth. As a rule the bonding has to be effected by expanding the tubes into the plate apertures or by soldering or brazing the tubes and the plates at their areas of contact, where the metals used will permit such form of bonding, or by a combination of these procedures. Bonding of either form has presented a problem of considerable magnitude where the metal used for the tubes and the header plates has involved differentials in expansion coefficients.

Conditions of use, fabrication techniques, and economics, in this industry, of necessity dictate the selection of material generally used for the construction of these units.

Foremost among the determinative conditions is the fact that such units are usually subjected to pressures of at least 150 p. s. i. This necessitates forming the header plates and headers—commonly referred to as "tanks"—of a metal with a relatively high tensile strength. When carbon steel is employed the factor of corrosion has to be considered and frequently necessitate making the plate of slightly greater thickness than would otherwise be necessary if this factor were not encountered. Also, it may be noted that the material selected must be one that can be fabricated by known shop techniques and methods. Obviously, the matter of costs have an influence in the selection of materials possessing the other required characteristics.

Carbon steel has been found to be the most suitable metal for the formation of the tanks.

The requisite of a fast rate of heat exchange influences the use of thin-wall tubes. The aforementioned factor of corrosion also affects a choice of the material for the tubes. These create a preference for such metals as aluminum, copper, or the copper base alloys, which incidentally, lend themselves to extrusion or bench drawing.

Specifically, heretofore it has not been practically possible to employ aluminum tubes with steel header plates which metals, by reason of their several respective physical properties are especially suited for the formation of these respective parts. Such impracticality has been due to the greater rate of expansion of aluminum over that of steel, with the consequent loss of elasticity in the aluminum after a recurring expansion and contraction against the less expansive steel header plate support for the tubes. The expansion coefficient of steel is .0000061 whereas that of aluminum is .0000123 (per degree Fahrenheit). Thus when the diametrical expansion of an aluminum tube is restricted by a steel header plate in a core unit which is subject to constantly changing temperatures the stress on the tube eventually exceeds its elastic limit and it ceases to return to its initial form and no longer maintains intimate contact with the header wall. The result is permanent deformation accompanied by joint leakage.

The main objects of this invention, therefore, are to provide an improved joint and method of forming the same for heat exchange core-units constructed of metals of respectively differing expansion coefficients; to provide an improved joint of this kind which is secure against the likelihood of leakage resulting from the possible elastic deterioration of the metal with the higher expansion coefficient when limited by the metal with lower expansion coefficient; to provide an improved joint of this kind and method of forming the same which is especially suitable for heat-exchange core-units wherein the header plates are made of steel and the tubes are formed of aluminum; and to provide an improved joint of this kind for either core-units requiring the use of removable agitator strips as, for example, where oil is used as the heat transfer medium, or those units not requiring the use of such agitator strips, as is most generally the case where water is used as the heat transfer medium.

In the accompanying drawings:

Fig. 1 is a perspective view—partially exploded—of one type of heat exchange core wherein the bonding of tube ends in the header plates in accordance with this invention is especially suitable;

Fig. 2 is an enlarged, fragmentary, cross sectional view of the header plate and bonded tube ends;

Figs. 3–8 illustrate the successive steps requisite to the forming of the aforesaid joint for a heat-exchanger core-unit where removable agitator strips are to be employed; and Figs. 9–14 illustrate the comparable successive steps for a core-unit where no tube agitators are to be employed.

The essential concept of this invention involves the bonding of an aluminum tube end in an apertured steel plate by means of an expanded or distorted ferrule of special type steel having an outside diameter before expansion predeterminedly greater than the inside diameter of the tube end.

A heat-exchange core-unit of a type wherein this invention is most practically applicable comprises, a pair of header plates 20 between which extend tubes 21 and to each of which is secured a header 22. Such a core unit is set into a suitable housing extending between the header plates 20 so as to provide a closure for the labyrinth around the tubes. The headers 22 are connected by suitable conduits to a source of heat transfer medium—generally oil, water, or steam—for flow through the tubes in heat exchange relationship with a cooling medium, usually air, flowing through the labyrinth around the tubes.

The plates 20 are formed with apertures 24 wherein the tube ends 25 are inserted and subsequently bonded to the plate to form a fluid-tight joint designed to preclude any leakage between the header chamber 26 and the labyrinth surrounding the tubes 22. As already noted heretofore, depending upon the character of the metals, this bonding of tube ends and header plates has been effected by either or both of the following procedures; expanding the tube ends 25 to press the exterior wall of the tube end against the defining wall of the aperture 24 or sealing the juncture of these abutting surfaces by means of solder or by the brazing of the metals.

Where these core-units are to be used with fluids subject to considerable range of temperatures no prior bonding procedure has made it practically possible to construct them of metals having a material differential in expansion coefficients. Particularly it has not been possible to use metals, otherwise acceptable, which could not be effectively soldered or brazed. This for the reason that the bonding involved too great a risk of possible leakage, which under certain circumstances might prove serious in its consequences.

For these reasons industry has been considerably limited in the metals that could be used in the manufacture of heat-exchange core-units. To a very great extent, therefore, copper base materials have had to be depended upon for the formation of such core-units.

As previously explained, because of the strength and rigidity often required for the header plates, and the factor of economy, steel is a most acceptable metal from which to form these parts of the core unit. Presently, aluminum is a most practical metal for the tubes. However, these metals have a material differential in expansion coefficients and metallurgically do not permit of an effective seal by soldering or brazing.

It may be noted here that in a core-unit having steel header plates and aluminum tubes and subject to recurring changes in temperatures between 70 degrees room temperature and 350 degrees F. steam the aluminum tubes would be inclined to expand and contract diametrically twice as much as the restricting steel header plates. For the tubes this constant subjection to high stresses after a fairly short time would result in a metal fatigue due to the fact that the aluminum exceeds its elastic limit and no longer will spring back to maintain contact with the header wall.

This invention, therefore, provides a means and method for rendering this metal fault uncritical in core-unit construction. Basically the invention involves the employment of a ferrule 27 of (1) a specific type of metal, (2) of a predetermined relative dimension with respect to the tubes wherewith it is to be used, and (3) its subsequent reformation in the tube.

The type of metal used for the ferrule 27 is extremely important. Strength and economics are influential factors second however to the compatibleness of the ferrule metal in the electrolytic or galvanic series to that from which the tubes are formed and its resistance to erosion from the fast flowing coolant through the tubes. A high accommodation to these four factors has been found in stainless steel, Type 304 which, incidentally, has an expansion coefficient of .0000090 per degree F. Consistent with its strength, its resistance to erosion, and the fact that it can be made extremely thin, so as not to unduly obstruct the coolant flow through the tubes, this type stainless steel effects a negligible electrolytic corrosion on the surrounding aluminum tube.

In actual use the invention is embodied in heat-exchanger core-units using tubes under one-inch outside diameter. However, the invention could be practical with core-units using larger tubes.

In the illustrated embodiments, the aluminum tubes are three-quarter inch outside diameter with the wall being .049" thick, thus constituting an inside diameter of .652" before diametrical expansion into fins. The header plate is formed of ¾" steel with drilled and reamed apertures 24 to receive the tube ends 25. The drawings illustrate the six-step procedure that is followed in practicing this invention. Most briefly stated these six steps are:

1. The forming of the apertures 24 in the header plates,
2. Inserting the tube end 25 into the header plate aperture,
3. Expanding the tube end to make a firm contact of the exterior surface of the tube with the face of the defining plate aperture wall,
4. Forming the ferrule 27 with the appropriate outside and inside diameters,
5. Pressing the ferrule into the expanded tube end, and
6. Rolling the ferrule to obtain the predetermined deformation thereof to secure the desired pressure of the tube end against the plate within the aperture.

The fifth step of pressing the ferrule 27 into the tube end is effected by an air tool. The final step of deforming or distorting the ferrule is carried out with a conventional rolling tool rotated by an electrical drill type of device which is connected to either electronic or overload relay type of controls so that the amount of distortion of the ferrule is predeterminedly uniform.

As previously noted, some core units employ internal tube agitators of a type that permit their removal for cleaning. This is usually the practice where oil is being cooled, flowing through the tubes, and sludge may deposit out due to the temperature drop encountered. The fundamental purpose of the agitators is to prevent stratification and overcome the lower conductivity of the petroleum oils by inducing turbulence with an accompanying higher heat transfer rate. Where the core-units are used with water as a coolant agitators generally are not used because very little can be gained toward increasing the heat transfer rate. Water has the highest conductivity of the common heat transfer mediums used and it can be pumped through a cooling system at a higher velocity than oil for a reasonable horsepower because of its lower density and friction coefficient; thus it is usually flowing in the turbulent state without the benefit of agitators.

In practicing this invention for these different types of core-units the only variation in the foregoing steps involves (a) the dimension of the plate aperture, (b) the amount of expansion of the tube end, (c) the dimension of the ferrule, and (d) the amount of distortion of the ferrule effected by the final rolling thereof. The relative differences are respectively indicated in Figs. 2–8 and Figs. 9–14.

In core-units constructed for agitators, the plate apertures 24 are formed with an inside diameter .070" larger than the outside diameter of the tube 21, an amount .028" less than twice the tube wall thickness. Thus when the tube end 25 is expanded, to press its exterior surface against the defining wall of the aperture, the tube wall at that area is slightly thinned so that the inside diameter of the expanded tube end is substantially equal to the normal outside diameter of the tube as shown in Fig. 5. For that embodiment the ferrule 27 is formed with an outside diameter .020" larger than the inside diameter of the expanded tube end 25 and an inside diameter of .672", i. e, .020" larger than the normal inside tube diameter. Thus when the ferrule is pressed into the expanded tube end the ferrule is forced to shrink .020", which is generally referred to as the "spring-back" characteristic of the metal. When the rolling tool is inserted into the ferrule its expansive pressure cannot move the heavy ¾" header plate and can but very slightly, if at all, further press or distort the tube wall which is in intimate contact with the plate. Consequently, the ferrule itself must be distorted an amount which is approximately equivalent to the original press or fit. As a result the ferrule is thinned and elongated and becomes work hardened, giving it maximum strength which in this instance comes out in the form of resistance to collapsing.

For core-units not requiring the use of agitators the diameter of the plate aperture 24 is such as to provide a .015" diametrical clearance for the tube end. Thus the "second step" expansion is very slight as compared with that step in the other core-unit. Also for this non-agitator type unit the ferrule dimensions are slightly different from that of the agitator type, as indicated in Fig. 12. However, the differential relationship is the same. That is, the ferrule is formed with an outside diameter .020" greater than the normal inside tube diameter.

Tube-header joints formed by this improved process have been laboratory tested under conditions comparable to or more severe than those met in actual service. Such joints held tight at 150 p. s. i. air under water and 500 p. s. i. hydraulic pressure. Experimental samples were subjected to alternate cooling and heating tests between room temperature and 140 p. s. i. steam (361° F.) and retested and the joints still found to be tight.

I claim:

1. A ferruled header-plate and tube joint for a thin-wall tubular heat exchanger wherein the heat transfer is between fluids one of which is flowing under high pressure and high temperature relative to the other, the joint comprising a steel header plate of a thickness not less than ten times the thickness of the tube wall and formed with an aperature greater in diameter than the outside diameter of the tube, an aluminum tube with a wall thickness approximately five hundredths of an inch, the tube end extending through the header plate and within the thickness of the plate being cold-worked expanded radially outward to an inside diameter not less than two percent greater than the normal inside diameter of the tube with the exterior of the tube wall in firm and intimate contact with and exerting an expanding pressure against the aperture wall, and a steel thin-wall ferrule of a length substantially equal to the length of the expanded tube end and having a tapered end press fitted into the expanded tube and cold-worked expanded radially outward with the exterior wall of the expanded ferrule in firm and intimate contact with and exerting an expanding pressure against the expanded end of the tube.

2. A ferruled header-plate and tube joint of the type set forth in claim 1 wherein the ferrule is stainless steel.

References Cited in the file of this patent

UNITED STATES PATENTS

| | | |
|---|---|---|
| 35,691 | Knickerbocker | June 25, 1862 |
| 1,102,163 | Opperud | June 30, 1914 |
| 1,601,093 | Widmeyer | Sept. 28, 1926 |
| 1,647,447 | Hartnett | Nov. 1, 1927 |
| 1,758,638 | Young | May 13, 1930 |
| 1,915,805 | Sutcliffe | June 27, 1933 |
| 2,368,391 | Young | Jan. 30, 1945 |

FOREIGN PATENTS

| | | |
|---|---|---|
| 17,802 | Great Britain | Dec. 6, 1888 |